3,355,441
PREPARATION OF REACTION PRODUCTS OF TET-
RAFLUOROHYDRAZINE WITH POLYVINYLFU-
ROATE, USEFUL AS ENERGETIC BINDERS FOR
PROPELLANTS
Anthony J. Passannante, Metuchen, N.J., assignor to Esso
Research and Engineering Company, a corporation of
Delaware
No Drawing. Filed Aug. 16, 1961, Ser. No. 134,799
9 Claims. (Cl. 260—88.5)

This invention relates to a process for preparing high-energy oxidizing polymer binders by an addition reaction of tetrafluorohydrazine ($N_2F_4$) with polyvinylfuroate.

The $N_2F_4$ adducts of polyvinylfuroate when suitably prepared to contain a high proportion of $NF_2$ groups, e.g. 2 to 4 $NF_2$ groups and preferably 3 to 4 $NF_2$ groups per monomeric unit are useful in high-energy rocket propellant systems and serve to increase the specific impulse (Isp) beyond that obtainable with polymeric binders lacking oxidizing groups.

Attempts to add $N_2F_4$ to polymeric compounds have shown that certain difficulties can arise in obtaining adequate contact of reactants and from formation of undesired decomposition products including some which may be explosive. On the other hand, direct addition of $N_2F_4$ to a preformed polymer has advantages in curtailing the handling of materials.

It has now been found in the development of the present invention that polyvinyl furoate can be satisfactorily solvated with a solvent for a safe and nearly complete saturation of the furan ring double bonds in polyvinyl furoate by $NF_2$ groups. For complete saturation, four difluoramino ($NF_2$) groups are added per furan ring in the polyvinylfuroate (PVF) according to the following equation:

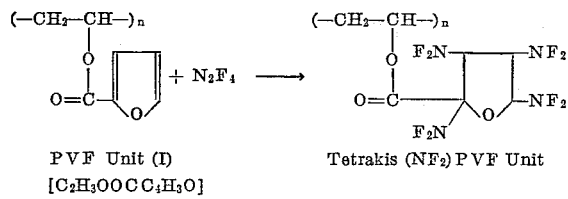

PVF Unit (I)　　　　　Tetrakis ($NF_2$) PVF Unit
[$C_2H_3OOCC_4H_3O$]

Various low- and high-molecular weight PVF polymers commercially available and such as prepared by reaction of polyvinyl alcohol with furoyl chloride $C_4H_3OCOCl$ have been used for the reaction with $N_2F_4$. The PVF polymers contain n multiple of the recurring units (I); so that for the higher molecular weight PVF polymers, n is a higher integer. In general, the high-molecular weight PVF has a molecular weight in the range of 20,000 to 200,000, and the low-molecular weight PVF has a molecular weight in the range of 2,000 to 20,000.

The low molecular weight PVF and mixtures of low- with high-molecular weight PVF are more soluble than the high-molecular weight PVF in the better solvents found suitable for the $N_2F_4$ reaction, e.g. particularly acetonitrile, chloroform, and acetonitrile-carbon tetrachloride.

For the addition of $N_2F_4$ to PVF, enough $N_2F_4$ is charged into the reaction zone containing the PVF reactant, to supply an excess of 1 $N_2F_4$ per PVF unit or per furan ring. Thus, for $NF_2$ saturation of the furan rings at least about 6 parts by weight of $N_2F_4$ are supplied per 4 parts by weight of the PVF.

Conditions found generally suitable for the PVF-$N_2F_4$ reaction are reaction temperatures in the range of about 100° to 130° C., $N_2F_4$ pressures in the range of about 250 to 500 p.s.i.a., and reaction periods in the range of 1 to 20 hours. These conditions can be varied, e.g. a reaction period with higher reaction temperature and better contact of the reactants in the reaction mixture.

A typical experimental procedure is described in the following example:

Example

A feed charge of 0.23 g. of polyvinylfuroate (20,000 molecular weight) is dissolved in 10 ml. of acetonitrile and the solution is placed in a 25 ml. stainless steel bomb. After degassing the solution at —196° C., (liquid $N_2$) 3.2 g. $N_2F_4$ are introduced into the solution in the bomb. The reactor is closed, warmed up, then heated at 125° C. for 4 hours. The unreacted $N_2F_4$ is removed. The resulting liquid solution is filtered and the solvent is evaporated from the filtrate to obtain 0.55 g. of difluoraminated polyvinyl furoate as residual product. Analysis: N, 12.36%; F, 34.7%; F/N ratio=2/1. This product contained 47% $NF_2$ compared to a theoretical 60.2% for tetrakis-$NF_2$ addition to the furan rings in the PVF, but higher $NF_2$ contents were obtained by extending the time using the same solvent and reaction temperature.

In a subsequent run using $N_2F_4$ at approximately 400 p.s.i.a. in acetonitrile, a higher uptake of about 1½ moles $N_2F_4$ per monomer unit was obtained. The difluoraminated PVF product obtained was a light tan to brown rubbery material easily dispersed in acetonitrile. The shock sensitivity of this product was in the range of 12 to 20 kg. inches. The analysis of the product and comparison to theoretical requirements are given in the following table.

TABLE 1

|  | $N_2F_4$ Addition to PVF | | |
| --- | --- | --- | --- |
|  | Percent N | Percent F | Weight Percent $NF_2$ |
| Product | 13.1 | 38.5 | 51.6 |
| Tetrakis ($NF_2$) Theory | 16.2 | 44.0 | 60.2 |

A further improved reaction was carried out using acetonitrile as diluent to obtain at least 95% reaction of the double bonds in the PVF, shown as follows:

TABLE 2

|  | $N_2F_4$ Addition to PVF | | | |
| --- | --- | --- | --- | --- |
|  | Percent N | Percent F | Percent $NF_2$ | F/N Ratio |
| Product | 42.6 | 15.67 | 58.3 | 1.98/1 |

Studies on varying conditions have shown that 4 hours reaction at 125° C. and about 400 p.s.i.a. $N_2F_4$ pressure gave optimum results.

Thus, using a polyvinyl furoate in which the recurring unit is principally [$C_2H_3OOCC_4H_3O$] the $N_2F_4$ reaction can be carried out as shown therewith to obtain a PVF-$N_2F_4$ reaction product in which the recurring unit is of similar order of magnitude principally

[$C_2H_3OOCC_4H_3(NF_2)_4O$]

A number of solvents have looked promising for use as reaction media, but there are differences in the effectiveness of the solvents. Acetonitrile acts well as a solvent but it may form some contaminants. However, these contaminants can be removed by extraction with an alcohol, e.g. methanol. Acetonitrile may be used in a mixed solvent, e.g. with $CHCl_3$, but again care must be taken to keep down reaction that forms contaminants. Other solvents, such as dioxane, chloroform, sulfolane and acetone, may be used in this reaction of PVF with $N_2F_4$ depending upon the amount of difluoramino groups desired in the product.

These solvents tend to react with $N_2F_4$ at high temperatures and long contact times and are therefore not suitable as solvents in areas where these conditions are necessary for attaining a high degree of addition of $N_2F_4$ to the PVF.

The PVF-$N_2F_4$ adducts are generally more soluble in $CH_3CN$ and $CHCl_3$ and less so in $CCl_4$. The higher molecular weight polymers tend to be less soluble in all solvents than the lower molecular weight product. These relationships indicate that these $NF_2$-containing polymers can be purified by selective extraction and precipitation. By further purification the PVF-$N_2F_4$ adduct is made reasonably stable. It is adequately stable for >60 hours at 60° C.

The PVF-tetrakis ($NF_2$) adduct

has a calculated heat of formation value, $\Delta H_f$, 298° K. of −187 Kcal./mol., which puts it in the class of high energy binders.

PVF ($NF_2$) adducts containing about 55% $NF_2$ by weight were found to have advantages of higher density (e.g., 1.64 g./cc.) and stability (low gas loss at 90° C.) compared to other polymer adducts. They are useful as binders with other oxidizers in the form of solids, binders, or liquid plasticizers, and high-energy fuels. For example, a propellant composition containing 25% tris ($NF_2$) adduct of PVF units [$CH_2CHOOCC_4H_3(NF_2)_3O$], as binder, 25% tetrakis ($NF_2$) butane, 7% B, and 43% $C_2(NO_2)_6$ has a specific impulse of 283.8 seconds. Other formulations of this type using the tris and tetrakis $NF_2$ adducts of PVF also have high Isp values above 270 seconds.

Modifications in the method of preparing the PVF-$NF_2$ binder and its use will be apparent to those skilled in the art within the scope of this invention.

What is claimed is:

1. Process for preparing $N_2F_4$ adducts of polyvinyl furoate which comprises solvating the polyvinylfuroate in a liquid solvent of low reactivity selected from the group consisting of acetonitrile, chloroform, carbon tetrachloride, and mixtures of acetonitrile with a halogenated hydrocarbon, and reacting the thus solvated polyvinyl furoate with admixed $N_2F_4$ at a reaction temperature in the range of about 100° C. to 130° C. under pressure and with an amount of the $N_2F_4$ to chemically combine from 2 to 4 $NF_2$ groups with double bonds of each furan nucleus in the polyvinylfuroate and recovering the resulting polyvinylfuroate-$N_2F_4$ adduct product containing the $NF_2$ groups.

2. A process as defined in claim 1, wherein the solvent is acetonitrile.

3. A process as defined in claim 1, wherein the solvent is chloroform.

4. A process as defined in claim 1, wherein the solvent is a mixture of $CH_3CN$ and a halogenated hydrocarbon.

5. A process as defined in claim 1 in which the polyvinylfuroate-$N_2F_4$ adduct product is purified by extracting alcohol-soluble impurities from said product.

6. Process for preparing difluoraminated polyvinylfluroate which comprises, dissolving polyvinylfuroate having a molecular weight in the range of 2,000 to 200,000 in liquid acetonitrile, reacting thus dissolved polyvinylfuroate in solution with $N_2F_4$ introduced into said solution at a reaction temperature of about 100° to 130° C. under a pressure of about 250 to 500 p.s.i.a., at least about 6 parts by weight of the $N_2F_4$ being introduced into said solution per 4 parts by weight of the polyvinylfuroate in the solution, carrying out the reaction for a period to form the difluoraminated polyvinylfuroate product, and recovering said product.

7. A process as defined in claim 6, wherein the acetonitrile solvent is mixed with chloroform.

8. A process as defined to claim 6, wherein the acetonitrile solvent is mixed with carbon tetrachloride.

9. A process as defined in claim 6, wherein the recovered product is purified by extracting alcohol-soluble impurities therefrom.

References Cited

Farber: Astronautics, August 1960, pages 34, 40, and 42.

JOSEPH L. SCHOFER, *Primary Examiner.*

HARRY WONG, JR., *Assistant Examiner.*